United States Patent
Straus et al.

(10) Patent No.: US 6,617,033 B1
(45) Date of Patent: Sep. 9, 2003

(54) METHOD FOR IN-MOLD COATING A POLYOLEFIN ARTICLE

(75) Inventors: Elliott J. Straus, Akron, OH (US); Douglas S. McBain, Wadsworth, OH (US)

(73) Assignee: OMNOVA Solutions Inc., Fairlawn, OH (US)

( * ) Notice: Subject to any disclaimer, the term of this patent is extended or adjusted under 35 U.S.C. 154(b) by 0 days.

(21) Appl. No.: 09/614,953

(22) Filed: Jul. 12, 2000

(51) Int. Cl.$^7$ .................. B32B 27/30; B32B 27/32; B32B 27/40
(52) U.S. Cl. .................. 428/424.2; 428/424.8; 428/500; 428/516; 428/519; 428/520
(58) Field of Search ................ 428/500, 424.2, 428/424.8, 520, 519, 516

(56) References Cited

U.S. PATENT DOCUMENTS

| | | | |
|---|---|---|---|
| 4,189,517 A | 2/1980 | Shanoski et al. | 428/423.7 |
| 4,222,929 A | 9/1980 | Shanoski et al. | 525/126 |
| 4,239,796 A | 12/1980 | Shanoski et al. | 428/315 |
| 4,316,869 A | 2/1982 | Van Gasse | 264/255 |
| 4,350,739 A | 9/1982 | Mohiuddin | 428/425.1 |
| 4,414,173 A | 11/1983 | Cobbledick et al. | 264/257 |
| 4,515,710 A | 5/1985 | Cobbledick | 252/511 |
| 4,668,460 A | 5/1987 | Ongena | 264/255 |
| 4,798,697 A | 1/1989 | Nohara et al. | 264/255 |
| 4,921,669 A | 5/1990 | Vetter et al. | 264/134 |
| 4,963,312 A | 10/1990 | Müller | 264/327 |
| 5,053,177 A | 10/1991 | Vetter et al. | 264/134 |
| 5,084,353 A | 1/1992 | Cobbledick et al. | 428/413 |
| 5,132,052 A | 7/1992 | Cobbledick et al. | 252/511 |
| 5,359,002 A | 10/1994 | Cobbledick et al. | 525/119 |
| 5,391,399 A | 2/1995 | Cobbledick et al. | 427/370 |
| 5,496,509 A | 3/1996 | Yamamoto et al. | 264/129 |
| 5,562,979 A | 10/1996 | Easterlow et al. | 428/327 |
| 5,614,581 A | 3/1997 | Cobbledick et al. | 264/255 |
| 5,632,949 A | 5/1997 | Fisher et al. | 264/255 |
| 5,639,403 A | 6/1997 | Ida et al. | 264/40.1 |
| 5,736,090 A | 4/1998 | Yamamoto et al. | 264/255 |
| 5,777,053 A | 7/1998 | McBain et al. | 526/301 |
| 5,882,559 A | 3/1999 | Eckardt et al. | 264/45.1 |
| 5,902,534 A | 5/1999 | Fujishiro et al. | 264/255 |
| 5,906,788 A | 5/1999 | Boeckler | 264/492 |
| 6,180,043 B1 | 1/2001 | Yonemochi et al. | 264/255 |

OTHER PUBLICATIONS

Patent Abstracts of Japan vol. 018, No. 094 (M–1561), Feb. 16, 1994 & JP 05 301251 A (Aisin Seiki Co LTD) Nov. 16, 1993.
"Isocyanate Polymers For In–Mold Coating Of Thermoplastic Sheet Composites" Plastics Engineering Society of Plastics Engineers, Inc. Greenwich, Conn, us vol. 52, No. 9 Sep. 1, 1996.
Chlorocarbons and Chlorohydrocarbons–C2 to Combustion Technology, Kirk–Othmer *Encyclopedia of Chemical Technology*, Fourth Edition, vol. 6, (1993), pp. 676–690.
The Sabreen Group, Inc.'s "Preparing Plastics for Painting" article, Oct. 26, 1999.
Barrett J; "Plastic Panels are Coated in Mould", Eureka (Inc. Engineerign Materials and Design), Findlay Publications, Horton Kirby, Kent, GB, vol. 12, NR. 2, pp. 31–32 XP000328032 ISSN: 0261–2097, the whole document, Feb. 1992.

*Primary Examiner*—D. S. Nakarani
(74) *Attorney, Agent, or Firm*—Fay, Sharpe, Fagan, Minnich & McKee; David G. Burleson

(57) ABSTRACT

The present invention is a process for producing an injection-molded thermoplastic work piece having a thermoset coating bonded thereto, comprising the steps of introducing into a closed mold a thermoplastic material, such as a polyolefin, heated to a temperature above its melting point and molding said material to form a work piece; followed by introducing a thermoset coating composition capable of generating free radicals into the closed mold to contact at least a portion of a surface of the work piece, the temperature of which is at or above the temperature at which free radicals contained in the coating composition are generated. The mold is then opened and the work piece is removed after the coating composition has at least partially cured. The present invention is also directed to a molded article made by the described process.

21 Claims, 2 Drawing Sheets

6,617,033 B1

METHOD FOR IN-MOLD COATING A POLYOLEFIN ARTICLE

FIELD OF INVENTION

The present invention relates to a method for coating a thermoplastic work piece with an in-mold composition. More particularly, the present invention relates to a process for in-mold coating of thermoplastic work pieces, such as polyolefin work pieces made by injection molding, one step of which comprises injecting a thermoset in-mold coating into the mold after the polyolefin substrate is solidified, or partially solidified, to provide a polyolefin work piece having a topcoat with excellent adhesion and requisite surface qualities. The polyolefin work pieces of the present invention require fewer exterior protective coatings or additional steps to prepare the work piece surface and, depending on the in-mold coating selected, may be suitable for use as is in an end use application. The present invention also relates to a polyolefin work piece having in-mold thermoset coatings bonded thereto.

BACKGROUND OF THE INVENTION

Molded thermoplastic materials, including polyolefins, are used in a variety of applications, such as the transportation, automotive, marine, recreation, construction, office products, and lawn and garden equipment manufacturing industries. Their use, however, is not without problems. In many instances, molded thermoplastic work pieces may need to be coated to facilitate paint adhesion, or to satisfy other surface property requirements, such as durability and weather resistance. Because of the inherent low surface energy of thermoplastics, generally, and in particular, polyolefins, they are difficult to paint or coat. Moreover, in view of the variation among the surface properties of individual polyolefins and the coating compositions to be applied, a method that works with one specific thermoplastic may not work with another. Hence, a variety of methods have been developed to achieve adhesion of coatings to the surface of molded thermoplastics materials, including materials such as polyolefins.

One of the most common methods is to micro-etch the surface of the thermoplastic to generate micro-roughness that will provide adhesion-anchoring sites for the paint or other top and primer coatings. Etching may be done by solvents, which may be incorporated in the paint or coating being applied. The selection of solvent is critical because different solvents etch thermoplastics at different rates. Both over-etching and under-etching must be avoided. Insufficient etching does not provide proper adhesion; excessive etching can damage the thermoplastic. Excessive etching, exposing the coating to bleeding from the thermoplastic, or exposing the thermoplastic to attack by the solvent may warp thermoplastic parts. If thermoplastics have areas that are highly stressed by the molding process, use of etching solvents can form visible cracks in these areas.

Another method of preparing the surface of a thermoplastic part for painting or coating is through de-glazing. When some thermoplastics are molded, a highly crosslinked (glazed) skin is formed which is resistant to solvent etching. Tumbling with a moderately abrasive media, or blasting with a mildly aggressive grit material, may de-glaze the thermoplastic surface sufficient to allow satisfactory adhesion of the paint or coating.

Creating micro-roughness through etching or de-glazing may not be desirable and, in some instances, not effective, depending on the particular thermoplastic surface involved. Other methods to prepare a thermoplastic surface utilize a chemical reaction to create polar oxidized groups on the thermoplastic surface. These surface polarizing methods include coating with an adhesion promoter, or subjecting the polyolefin work piece to flame or plasma treatment, in order to make the thermoplastic surface chemically polar so it will bond with the coating. Low polarity thermoplastics can also be oxidatively surface treated using light sensitive chemicals called photosensitizers, followed by exposure to ultraviolet light. UV light cracks the molecules of the photosensitizers for form free radicals. Free radicals are extremely reactive species that combine with oxygen in the air. Oxygen free radicals, in turn, react with the thermoplastic to produce polar groups on the thermoplastic surface.

Previously, molded thermoplastic work pieces were formed in a mold, the molded product removed, and a coating was then applied on the surface of the molded work piece by a coating process, such as a surface treatment, primer coating, top coating, painting, etc. Hence, all of the foregoing methods required an additional step to achieve a finished surface on a thermoplastic work piece, which is treating the surface of the pre-formed thermoplastic work piece prior to applying a paint or coating. These methods required additional steps and increased costs of preparing the molded work piece surface.

It became desirable, therefore, to have a method by which a coating could be applied to a thermoplastic work piece in the mold, resulting in a coated thermoplastic work piece the surface of which would be finished and suitable for use as is in an end use application, or which would require less surface preparation treatment than heretofore utilized.

Application of in-mold coatings (IMC) to thermoplastic materials to provide generally smooth surfaces, improve durability and other surface properties, and to reduce or eliminate substrate porosity is known. A number of in-mold coating methods have been employed for applying primer coatings, in compression molding methods or injection molding methods employing molding materials of thermosetting resins, such as SMC (sheet molding compound) and BMC (bulk molding compound) (e.g., U.S. Pat. Nos. 4,076, 788; 4,081,578; 4,331,735; 4,366,109; and 4,668,460).

Typical in-mold coatings are set forth in U.S. Pat. No. 4,189,517 and U.S. Pat. No. 4,222,929, which have been applied to fiber reinforced thermoplastics (FRP), such as sheet molding compounds, and which are the reaction products of an unsaturated fumarate polyester diol, a saturated polyester diol flexibilizer, a crosslinking aliphatic polyol, having from 3 to 6 hydroxyl groups, a diisocyanate, and an ethylenically unsaturated crosslinking compound, such as styrene. U.S. Pat. No. 4,331,735 sets forth a liquid crosslinkable composition having an average molecular weight of up to about 5,000 and a plurality of polymerizable ethylenic double bonds, being essentially free of active hydrogen atoms or being essentially free of isocyanate groups; a material such as a polyisocyanate or a reaction product of a polyisocyanate and an ethylenically unsaturated compound having —NH2 groups, —NH and/or —OH groups, said reaction product being free of active hydrogen atoms; and an organic free radical peroxide initiator.

Other coatings relate to those comprising at least one polymerizable epoxy-based oligomer having two acrylate groups thereon, at least one copolymerizable ethylenically unsaturated monomer such as styrene, and at least one copolymerizable monoethylenically unsaturated compound having a —CO— group and a —NH2, —NH—, and/or —OH group, as well as polyvinyl acetate, as set forth in U.S. Pat. No. 4,414,173 and U.S. Pat. No. 4,515,710 to Cobbledick et al.

Still other coatings include a conductive, thermoset in-mold coating for molded FRP parts, the binder of which comprises at least one polymerizable epoxy-based oligomer having at least two acrylate groups and at least one copolymerizable ethylenically unsaturated monomer, which provides good flow and coverage during molding, good adhesion, uniform color, good surface quality, and good paintability, as set forth in U.S. Pat. No. 5,614,581. Still other in-mold coatings include free radical peroxide initiated thermosetting compositions comprising an epoxy-based oligomer having at least two acrylate end groups and a hydroxy or amide-containing monomer, as set forth in U.S. Pat. Nos. 5,391,399; 5,359,002; and U.S. Pat. No. 5,084,353 to Cobbledick et al.

In-mold coating compositions, which have appearance or paint-like properties, are also known. Appearance in-mold coating compositions are desirable because they eliminate the additional step, time and cost of applying paint to the surface of an in-mold coated work piece.

One such appearance in-mold coating is disclosed in U.S. Pat. No. 5,736,090. The '090 patent relates to a method of coating a polyamide work piece by utilizing an in-mold coating composition capable of providing a coating having sufficient durability with respect to adhesion, appearance, and weather resistance, and which functions as a top coating applicable to exterior parts of automobiles or other outdoor applications. The in-molding coating composition comprises, as a vehicle component, a urethane acrylate oligomer or a urethane methacrylate oligomer and a polymerizable unsaturated monomer; a polyisocyanate compound; and a polymerization initiator, where the oligomer itself is a reaction product of an organic polyisocyanate, an organic polyol, and a hydroxy alkyl acrylate and a hydroxy alkyl methacrylate.

Another example of an appearance in-mold-coating is the cured in-mold coating composition suitable for use on fiber reinforced thermoplastic (FRP), which comprises a saturated polyester urethane acrylate made from a saturated aliphatic polyester intermediate, a saturated aliphatic urethane group and a saturated hydroxyl (alkyl) (meth) acrylate, as set forth in U.S. Pat. No. 5,777,053, the disclosure of which is incorporated herein by reference. The '053 patent relates to the use of a diacrylate ester of an alkylene diol, a saturated (cyclo) aliphatic (meth) acrylate, and a vinyl substituted aromatic to impart paint coating type properties to the in-mold coating composition, such as hardness, water resistance, low shrinkage, and high gloss. Optionally, and in addition to the aforenoted components, crosslinking agents, such as triallylcyanurate, ethoxylated trimethylolpropane triacrylate, pentaerythritol triacrylate and the like may be utilized. The components are reacted in the presence of an initiator, such as a peroxide, to chain extend and to form the thermoset saturated polyester urethane acrylate coating resin. The cured resin is a clear in-mold coating composition, which, if desired, may be pigmented using various pigments, colorants, etc., known to the art, to yield a desired end color and opacity. Appearance or paint-like properties of these in-mold coatings are achieved by avoiding various components, especially aromatic compounds such as aromatic polyesters and/or polyether urethane intermediates, aromatic epoxy-based resins and the like. These compositions have been used successfully to form a paint-free FRP end product laminate. The FRP molds were prepared in a closed mold from polyester SMC. Molding conditions for the SMC were 300° F. (149° C.), a 70 second cure time, and 1000 psi of pressure. The in-mold coating compositions were applied immediately following SMC cure by opening the mold, injection or otherwise applying the coating onto the FRP molding, followed by re-closing of the mold. The cure conditions for the IMC were 300° F. (149° C.), a 60 second cure time, and 1000 psi of pressure.

In view of the predominance of the use of injection molded polyolefin substrates in the transportation, automotive, marine, recreation, construction, office supply, and lawn and garden manufacturing industries, it is desirable to provide an in-mold coating method for use in injection molding of polyolefin work pieces. Due to the above-described, inherently low surface energy of polyolefins, which creates coating adhesion issues, and the lower, standard molding temperatures (150–170° F.) utilized in injection molding of polyolefins, sufficient covering or adherence to the polyolefin work piece by the in-mold coating has been difficult to achieve.

One method for coating a polyolefin work piece in a way, which avoids having to apply an additional coating of paint to a preformed prert, is disclosed in U.S. Pat. No. 5,562,979. The '979 patent relates to a dual injection molding technique which involves heating a powdered plastic paint coating material to its plastic phase and then injecting it under pressure into a mold, followed by injecting a thermoplastic substrate material under pressure into the mold to cause the coating material to coat a surface of the mold, thus producing a work piece coated by the plastic paint coating material. The paint and substrate materials are selected so as to have an affinity for each other, and the method may include effecting cross-linking between the coating and substrate during molding and curing. The method is illustrated using a polypropylene substrate heated to a temperature of 230° C. (446° F.) to enable it to be extruded into the mold at a pressure of 1300 bar. The method is disadvantageous, however, because it requires additional time to grind the paint material, which is normally produced as a solid sheet, into a powder or into a granulated form, and to heat the ground or granulated material to its plastic phase. Another disadvantage of this method is that it requires the use of two separate extruders. Still another disadvantage of the method, which is very limiting, is that requires that the materials selected have affinity for each other, or that the selected materials be chemically modified to work together.

It has been discovered that injection molding of polyolefin substrates and coating with the in-mold coating compositions, as described in the '053 patent above, was successful in making coated polyolefin parts having a thoroughly cured coating. Furthermore, the coating exhibited good adhesion to the substrate. For purposes of the present invention, the use of a free radical initiator, as a chain extension component, in conjunction with the curing monomers of the described in-mold coatings, is thought to be important to the quality of the appearance and the properties obtained. While not wishing to be bound by any theory, it is believed that the use of a free radical initiator, such as a peroxide compound, promotes the adhesion of the in-mold coating composition to the surface of the polyolefin work piece. It is thought that the free radicals generated within the coating composition react with the surface of the polyolefin in some manner and thereby permit a bonding or adhesion of the coating to the polyolefin.

A process by which polyolefin substrates having in-molded coatings thereon leas been developed. In-mold coating of polyolefin work pieces, whereby the coating composition has good flow and coverage during molding, good adhesion, uniform color, good surface quality, and, if necessary, good paintability, may be successfully achieved during injection molding processes, by increasing only slightly the temperature at which the polyolefin substrate is injection molded and through the use of the above-described, standard in-mold coatings, comprising a free radical-initiator, such as a peroxide compound.

It is an object, of the present invention to provide an injection molding process by which thermoplastic substrates may be coated with in-mold compositions, to form finished work pieces which are suitable for use as is in an end use application or which require minimal surface post-treatment.

It is an object of the present invention to provide an injection molding process by which polyolefin substrates may be coated with in-mold compositions, to form finished polyolefin work pieces which are suitable for use as is in an end use application or which require minimal surface post-treatment.

It is a further object of the present invention to eliminate the time and cost of pretreating a pre-formed thermoplastic or polyolefin work piece to accept a paint or other coatings thereon.

A further object of the present invention is to eliminate the need of applying additional paint or other surface treatment coatings to a surface of a pre-formed thermoplastic or polyolefin work piece.

A further object of the present invention is to provide a thermoplastic or polyolefin work piece having an appearance in-mold coating thereon, which has paint-like properties, such as high gloss, hardness, good adhesion and good weatherability.

A further object of the present invention is to provide a thermoplastic or polyolefin work piece having an in-mold coating thereon, which has good flow and coverage during molding, good adhesion, uniform color, durability, weather resistance, good surface qualities, and good paintability.

SUMMARY OF INVENTION

Figure 1:
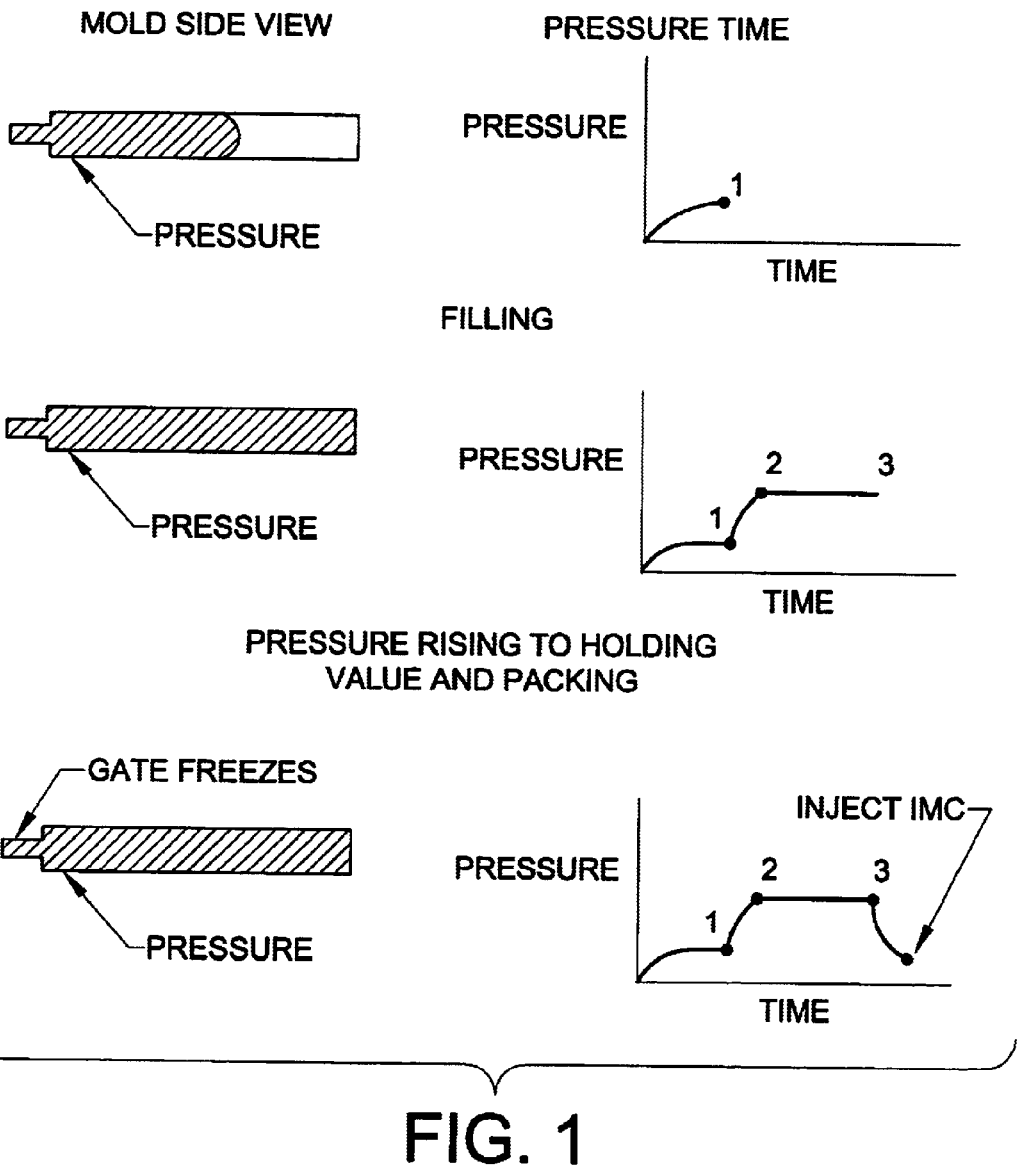
FIG. 1 shows the three basic stages of the thermoplastic injection molding cycle.

The present invention is a process for producing an injection molded thermoplastic work piece having a thermoset coating bonded thereto, comprising the steps of introducing into a closed mold a thermoplastic material, such as a polyolefin, heated to a temperature above its melting point and molding said material to form a work piece; followed by introducing a thermoset coating composition capable of generating free radicals into the closed mold to contact at least a portion of a surface of the work piece, the temperature of which is at or above the temperature at which free radicals contained in the coating composition are generated. The mold is then opened and the work piece is removed after the coating composition has at least partially cured.

Polyolefin parts, in-mold coated with a composition having good adhesion and good surface properties, may be produced using the compositions of the present invention, which are thermoset in-mold coatings comprising an initiator capable of generating free radicals, such as, for example, a peroxide or an azo-initiator.

DETAILED DESCRIPTION OF THE INVENTION

The process of the present invention utilizes in-mold coatings, which are available commercially. Such coatings include GENGLAZE® 7 and STYLECOAT® 9, appearance in-mold coatings available from Omnova, as well as other topcoats and primers. Such coatings are well known to the art. For example, hydroxy-functional thermosetting acrylics are widely used in baking enamels for automobile and appliance topcoats, exterior can coatings, and coil coating the main advantage of acrylic coatings is the high degree of resistance to thermal and photoxidation and to hydrolysis, giving coatings that have superior color retention, resistance to embrittlement and exterior durability. Low-molecular weight acrylic resins having an average functionality of two to three and containing few molecules that are nonfunctional or only monofunctional are useful in the present invention. The usual method for synthesizing these thermosetting acrylic resins is through free radical polymerization, which results in a random distribution of the 2-hydroxyethyl methacrylate (2-methyl-2-propenoic acid 2-hydroxyethyl ester) comonomer in the oligomer chain.

Epoxy resins are also useful in the present invention. A principal use of epoxy resins is as a component in two-package primer coatings. One part contains the epoxy resin and the other part contains a polyfunctional amine. Amine-terminated polyamides, sometimes called amido-amines, are widely used. A preferred epoxy resin is an epoxy-based oligomer having at least two acrylate groups and at least one copolymerizable ethylenically unsaturated monomer, and at least one copolymerizable monoethylenically unsaturated compounds having a CO$^-$, and a —NH2—, NH, and/or —OH— group.

The present invention also contemplates the use of other resin coatings, such as alkyds, polyesters, urethane systems, amino resins, phenolic resins, and silicone resins. See e.g., Kirk Othmer, Encyclopedia of Chemical Technology, Vol. 6 (4$^{th}$ ed. 1993) at pp. 676–690. The choice of the coating resin is not particularly critical to the present invention, provided that the resin is capable of being free radical initiated to graft to a polyolefin substrate.

The present invention thus contemplates the, use of peroxide initiators, or any other initiator or chain extending component capable of generating free radicals, such as an azo-initiator, in conjunction with the use of any of these known in-mold coatings. The selection of the initiator may depend upon the particular resin selected for the coating.

One embodiment of the present invention utilizes appearance in-mold coatings comprising five components. One such component is a saturated aliphatic polyester intermediate urethane, which contains acrylate groups, generally at the terminal portions of the polymer. The polyester intermediate of the urethane can be made from aliphatic dicarboxylic acids or aliphatic anhydrides and glycols and such are well known to the art and to the literature, as is the preparation thereof, and are commercially available. The aliphatic dicarboxylic acids and anhydrides have from 1 to 15 carbon atoms and are desirably saturated (i.e., have no unsaturated carbon to carbon double bonds), with specific examples including carbonic acid, malonic acid, succinic acid, glutaric acid, adipic acid, pimelic acid, suberic acid, azelaic acid, sebacic acid, the anhydride counterparts thereof, and the like, with adipic acid generally being preferred. Mixtures of all of the above acids can be utilized as well. The glycols or diols generally have from 2 to 15 carbon atoms and are saturated, with specific examples including ethylene glycol, propylene glycol, 1,3-butylene glycol, 1,4-butylene glycol, pentane diol, hexane diol, cyclohexanedimethanol dipropylene glycol, 2,2-dimethyl-1,3-propane diol, diethylene glycol, pinacol, and the like. Preferred glycols include ethylene glycol and neopentyl glycol.

The saturated aliphatic polyester intermediate generally has a number average molecular weight of from about 1,000 to about 5,000, and desirably from about 1,500 to about 2,500.

An aliphatic polyisocyanate is reacted with the saturated polyester intermediate to form a polyurethane type resin. The aliphatic portion is saturated and has from about 5 to 18 carbon atoms such as isophorone diisocyanate (IPDI), hexamethylene diisocyanate, cyclohexyl diisocyanate, and the like, with isophorone diisocyanate being preferred. The average equivalent ratio of NCO groups to OH end groups of the intermediate is approximately from about 1.5 to about 2.5, desirably from about 1.9 to about 2.1, and preferably about 2.0. Such amounts are generally sufficient to form an isocyanate terminated polyurethane. prepolymer which is then reacted with a hydroxyl alkyl acrylate to form the saturated polyester urethane contain an acrylate or methacrylate generally at the terminal portions of the polymer chain. The acrylates can generally have an ester portion containing from 2 to 10 carbon atoms, such as ethyl, prop 1-n-butyl, ethylhexyl, and the like, with ethyl and propyl being preferred. An example of a preferred polyester urethane acrylate is Craynor CN 963, manufactured by Sartomer Corporation, which is a polyester urethane acrylate.

Polyester urethane acrylates, which contain unsaturated and/or aromatic polyester intermediates, are avoided, as are aromatic and/or unsaturated diisocyanates, inasmuch as they may yield a clear coating or a non-clear coating with a tendency to yellow and degrade on aging. The polyester urethane acrylates are substantially free of such compounds, meaning that they generally contain unsaturated and/or aromatic polyester intermediates in an amount less than 50 or 25 percent by weight, desirably less than 10 percent by weight, and preferably less than 5 percent by weight, or none at all, of such units or groups based upon the total weight of such polymer(s). Similarly, generally less than 50 or 25 percent and preferably less than 10 or 5 mole percent, or none at all, of all diisocyanate groups within the coating composition are aromatic and/or unsaturated groups based upon the total moles of isccyanate required. Other compounds or monomers that are avoided in the formation of the polyester urethane acrylates are polyethers and epoxy intermediates inasmuch as the same have been found not to yield an in-mold coating composition, which provides good weatherability properties. Thus, the polyurethane intermediate generally contains less than 50 percent by weight and generally less than 25 percent by weight, and preferably less than 10 or 5 percent by weight, or none at all, of polyether and/or epoxy groups based upon the total weight of the polyester urethane acrylates.

Various compounds or components are utilized to react with the polyester urethane acrylate and form a thermoset resin. One such component is an aliphatic or cycloaliphatic portion (meth) acrylate wherein the aliphatic and/or cycloaliphatic portion is saturated and contains from about 1 to about 50 carbon atoms and desirably from about 2 to about 20 carbon atoms. Representative examples include methyl (meth) acrylate, tetrahydrofurfuryl acrylate, lauryl methacrylate, stearyl methacrylate, lauryl acrylate, glycidyl methacrylate, isodecyl acrylate, isobornyl methacrylate, isooctyl acrylate, tridecyl acrylate, tridecyl methacrylate, and caprolactone acrylate, with isobornyl acrylate being preferred. The amount of the saturated (cyclo) aliphatic (meth)acrylate is generally from about 20 to about 100 parts by weight, desirably from about 35 to about 90 parts by weight, and preferably from about 50 to about 80 parts by weight per 100 total parts by weight of the polyester urethane acrylate.

Another component utilized in the resin of the present invention is one or more hydroxy alkyl (meth)acrylates, wherein the alkyl group can contain from 1 to 5 or 10 carbon atoms, such as methyl, ethyl, butyl, etc., with propyl being preferred. The amount of such hydroxy alkyl (meth) acrylates is generally from about 2 to about 20 parts by weight, desirably from about 6 to about 16 parts by weight, and preferably from about 8 to about 12 parts by weight per 100 parts by weight of the polyester urethane acrylate. These compounds are utilized in addition to the hydroxy alkyl methacrylates utilized to form the polyester urethane acrylate resins.

Still another component utilized in the in-mold coating composition of the present invention are one or more vinyl substituted aromatics containing a total of from 8 to 12 carbon atoms such as styrene, a-methyl styrene, vinyl toluene, t-butyl styrene, and the like, with styrene being preferred. The amount of this component is generally from about 10 to about 70 parts by weight, and preferably from about 30 to about 50 parts by weight per 100 parts by weight of the polyester urethane acrylate.

Still another component is a polyacrylate such as a triecrylate or preferably a diacrylate ester of an alkylene polyol wherein the polyol has from about 2 to about 30 carbon atoms and preferably from about 2 to about 10 carbon atoms such as ethylene diol, butane diol, and the like. An acrylate, which is contained on both ends of the alkylene polyol, is generally derived from acrylic acid or methacrylic acid. Examples of the preferred diacrylate ester of an alkylene diol include triethylene glycoi dimethacrylate, ethylene glycol dimethacrylate, tetraethylene glyool dimethacrylate, polyethylene glycol dimethacrylate, 1,3 butylene glycol, 1,4-butanediol diacrylate, 1,4-butanediol dimethacrylate, diethylene glycol diacrylate, diethylene glycol dimethacrylate, 1,6 hexanediol diacrylate, 1,6 hexanediol dimethacrylate, neopentyl glycol diacrylate, neopentyl glycol dimethacrylate, polyethylene glycol (600) dimethacrylate, polyethylene glycol (200) diacrylate, tetraethylene glycol diacrylate, triethylene glycol diacrylate, 1,3 butylene glycol dimethacrylate, tripropylene glycol diacrylate, polyethylene glycol (400)diacrylate, polyethylene glycol (400) dimethacrylate, polyethylene glycol (600) diacrylate, propoxylated neopentyl glycol diacrylate, and alkoxylated aliphatic diacrylate. Examples of trifunctional acrylate esters of an alkylene polyol, which can be optionally utilized, include tris (2-hydroxy ethyl) isocyanurate trimethacrylate, trimethylolpropane trimethacrylate, trimethylolpropane triacrylate, tris (2-hydroxy ethyl) isocyanurate triacrylate, ethoxylated trimethylolpropane triacrylate, pentaerythritol triacrylate, propoxylated trimethylolpropane triacrylate, and propoxylated glyceryl triacrylate. The amount of the polyacrylate ester of the alkylene polyol is generally from about 10 to about 40 parts by weight, desirably from about 15 to about 35 parts by weight, and preferably from about 20 to about 30 parts by weight for every 100 parts by weight of the polyester urethane acrylate. The amount of the optional triacrylate ester of the alkylene polyol is low and generally is less than 10 parts by weight and preferably less than 5 parts by weight for every 100 parts by weight of the polyester urethane acrylate.

The above five components generally form the resin of the in-mold coating composition contemplated for use in the present invention, which is prepared as follows. The polyester urethane acrylate is mixed with the vinyl substituted aromatic monomers such as styrene, the saturated aliphatic or cycloaliphatic (meth) acrylates such as isobornyl acrylate, and the hydroxyalkyl methacrylate, such as hydroxypropyl methacrylate. After these compounds are mixed, fillers and additives, such as cure inhibitors, light stabilizers, lubricants, etc., are added and mixed. The free radical generating initiator is added last.

The polyacrylate ester of a polyol can be present in the polyester urethane acrylate from the supplier.

The above appearance in-mold coating composition is clear after curing. Any of the coatings contemplated for use in the present invention can be colored by utilizing a pigment, a colorant, etc., in a desired or effective amount to yield a desired color, tint, hue, or opacity. Pigments, pigment dispersions, colorants, etc. are well known to the art and include, for example, graphite, titanium dioxide, carbon black, phthalocyanine blue, phthalocyanine red, chromium and ferric oxides, aluminum or other metal flake, and the like.

When an in-mold coating having a specific color is desired, one or more pigments, colorants, etc., can be utilized in suitable amounts. As known to the art, often times various pigments or colorants are added with a carrier, for example, a polyester, so that they can be easily blended. Any or suitable mixing vessel can be utilized, and the various components and additives mixed until the compounds are blended. Even if pigments are not contained in the blend, the mixture at this point is not clear.

All of the above-described in-mold coating compositions that may be utilized in the present invention may contain other additives and fillers, etc., in amounts known to the art. For example, various cure inhibitors such as benzoquinone, hydroquinone, methoxyhydroquinone, p-t-butylcatechol, and the like, can also be utilized. Other additives may include an accelerator, such as cobalt octoate. Other classes of accelerators include zinc, or other metal carboxylates. Various light stabilizers can also be utilized such as, for example, the various hindered amines (HALS), substituted benzophenones, and substituted benztriazoles, and the like. Lubricants and mold release agents are generally utilized with specific examples including various metal stearates, such as zinc stearate or calcium-stearate or phosphonic acid esters. Reinforcing fillers, such as talc, can be utilized. Other additives include hardeners, thixotropes, such as silica, and adhesion agents, such as polyvinyl acetate.

The curing monomers or components of the coatings contemplated by the present invention are chain extended through the utilization of a free radical initiator, such as a peroxide. Examples of suitable free radical initiators include tertiary butyl perbenzoate, tertiary butyl peroctoate in diallyl phthalate, diacetyl peroxide in dimethyl phthalate, dibenzoyl peroxide, di(p-chlorobenzoyl)peroxide in dibutyl phthalate, di(2,4-dichlorobenzoyl)peroxide in dibutyl phthalate dilauroyl peroxide, methyl ethyl ketone peroxide, cyclohexanone peroxide in dibutyl phthalate, 3,5-dihydroxy-3,4-dimethyl-1,2-dioxacyclopentante, t-butylperoxy (2-ethyl hexanoate), caprylyl peroxide, 2,5-dimethyl-2,5-di(benzoyl peroxy) hexane, 1-hydroxy cyclohexyl hydroperoxide-1, t-butyl peroxy (2-ethyl butyrate), 2,5-dimethyl-2,5-bis(t-butyl peroxy) hexane, cumylhydroperoxide, diacetyl peroxide, t-butyl hydroperoxide, ditertiary butyl peroxide, 3,5-dihydroxy-3, 5-dimethyl-1,2-oxacyclopentane, and 1,1-bis(t-butylperoxy)-3,3,5-trimethyl cyclohexane and the like, and mixtures thereof. It is sometimes desirable to use mixtures of initiators to take advantage of their different decomposition rates and times at different temperatures and so forth. A preferred initiator to use is tertiary butyl perbenzoate.

Azo-initiators useful for the non-aqueous application of this invention include: 2,2'-azobis (2,4-Dimethylpentanenitrile); 2,2'-azobis(2-Methylpropanenitrile); 2,2'-azobis(2-Methylbutahenitrile); 1,1'-azobis(Cyclohexanecarbonitrile); 2,2'-azobis(4-Methoxy-2,4-dimethylvaleronitrile); Dimethyl-2,2'-azobisisobutyrate; 2-(Carbamoylazo)-isobutyronitrile; 2,2'-azobis (2,4,4-Trimethylpentane); 2-Phenylazo-2,4-dimethyl-4-methoxyvaleronitrile); and 2,2'azobis(2-methylpropane).

The initiators should be used in an amount sufficient to overcome any effect of any inhibitors used and to cause curing of the ethylenically unsaturated compounds. In general, the peroxide initiator is used in an amount of up to about 5% or from about 0.25 to about 5%, desirably from about 1 to about 4%, and preferably from about 1 to about 2%, by weight, based on the total weight of all of the ethylenically unsaturated components employed in the in-mold coating compositions.

The process of the present invention contemplates a reaction of the in-mold coating compositions, in the presence of a peroxide initiator, with the curing components of the polyolefin substrate at a temperature of from about 200° F. (93° C.) to about 330° F. (165° C.), and is desirably from about 270° F. (132° C.) to about 310° F. (154° C.). In the present process, temperatures are less than the melt temperature of the polyolefin and are sufficient for the free radical initiator to work.

Generally, the process of the present invention involves heating a polyolefin substrate to a temperature above its melting point, and maintaining a molding or tool temperature for a polyolefin substrate. For example, for polypropylene, a molding temperature of 200–250° F., as compared to the standard 150–170° F. molding temperature for polypropylene, is utilized. The heated polyolefin is injected into a closed mold to form a work piece. The in-mold coating composition is then injected into the mold containing the polyolefin substrate where it contacts the polyolefin substrate surface, which is at or above the temperature at which free radicals are generated in the in-mold coating composition and at which a cure of the coating composition will be effected. The cure temperatures will vary depending upon the particular curative or peroxide utilized, as well as the tooling and injection molding set-up. Suitable cure temperatures generally range from about 200° to about 330° F. (from about 93° to about 165° C.). For purposes of the present invention, it has been found that cure of the in-mold coating composition and good adhesion to the polyolefin substrate may be obtained at molding temperatures, i.e., in the range of 200–250° F.

The in-mold coating process applied to thermoplastic injection molding of polyolefins, as described herein, involves several steps. The process requires locating an IMC nozzle within the parting line of a mold cavity, preferably but not restricted to the surface of the part opposite the surface from the ejector pin mechanisms and thermoplastic injection sprues. A metering system is used to inject a specified volume of initiated liquid IMC through the nozzle under relatively high pressure (1000–5000 psi; 70–350 bar).

Figure 2:
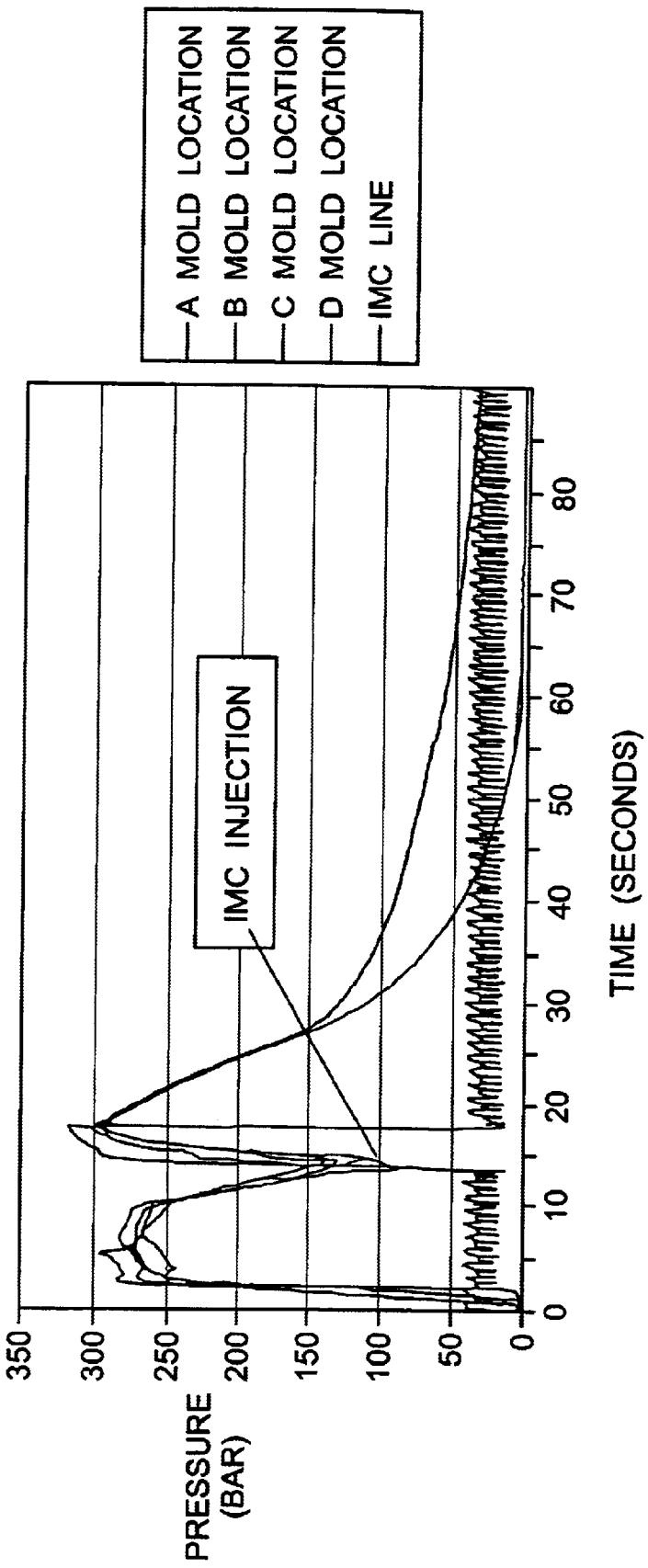
FIG. 2 shows a typical cavity pressure during in-mold coating injection.

The thermoplastic injection molding cycle is usually represented graphically as shown in FIGS. 1 and 2. The three basic stages of the cycle are filling, packing, and cooling. The pressure rises at a relatively slow rate during the filling cycle. The packing stage is the one in which the shrinkage is offset by maintenance of very high pressure. Finally, during the cooling stage, the pressure in the mold falls. The decrease in the pressure during the cooling period depends on the PVT behavior for the thermoplastic material being processed. The in-mold coating should be injected during this period. The longer the time between the end of the filling stage and the coating injection, the lower the packing pressure, but the lower the substrate temperature. Thus, the ease of injection, must be balanced with the temperature required to obtain an adequate curing of the coating.

The typical shelf life of an in-mold coating initiated with TBPB is approximately 10–14 days at room temperature. The shelf life is reduced when storage temperatures are elevated above room temperature.

For systems designed for a lower temperature cure (~(approx.) 200° F.), alternative catalysts and resin modifications greatly reduce shelf life, but still are adequate for production processing scenarios.

The present process, utilizing the described in-mold coatings, provides a molded article having excellent appearance and surface properties. One such property is clarity. Upon cure or chain extension, the appearance in-mold coating composition becomes clear. Traditionally, clarity can be measured by a subjective eye test, that is, the lack of any imparted color to any underlying substrate. Clarity can also be demonstrated by using other methods known to the art, such as measuring the color of a substrate with a color spectrophotometer, both before and after coating with the in-mold coating compositions.

The appearance in-mold coating compositions utilized in the present invention have other advantageous properties in addition to high clarity. These include good adhesion to the polyolefin substrate, good hardness, good scratch resistance, good water resistance, as well as good ultraviolet resistance. The surface of the coated polyolefin work piece is smooth and has a high degree of gloss. Such properties result in a polyolefin work piece having a finished surface, since it has good weatherability resistance and other good paint properties so that painting, which heretofore has been required is not needed. That is, the in-mold coating composition when cured can be utilized as is with regard to a particular end use application and does not need, or is substantially free of any need for subsequent surface treatments, e.g., coating, another layer, etc., such as a paint, and the like. In other words, the in-mold coating composition surface is substantially treatment free meaning that generally less than 10 grams and preferably less that 5, 3, 2, or 1 grams by weight per sq. ft. of any protective coating, film, layer, or surface treatment is applied, and preferably is totally free thereof.

The in-mold coatings of the present invention are generally flexible and can be utilized on any polyolefin surface. Polyolefins which may be coated using the process of the present invention include, among others, polypropylene, polyethylenes, polystyrenes, polybutylenes and substituted polyolefins. Other thermoplastic materials, such as nylon, are also contemplated by the invention. Suitable uses for the in-mold coated articles of the present invention include various automotive parts, such as bumpers and fascias, as well as marine and lawn and garden machine parts, and recreation, construction or office products.

The invention will be better understood by reference to the following examples, which serve to illustrate, but not to limit the scope of the present invention.

EXAMPLES

Example 1

Recipe A (see Table A) was mixed and molded as follows:

The polyurethane acrylate, diacrylate ester of hexane diol, styrene, isobornyl acrylate and hydroxypropyl methacrylate in the indicated amounts were added to a container and mixed thoroughly using mixing procedures for organic resin solutions. The hydroquinone, cobalt octoate, hindered amine light stabilizer (HALS), UV absorber and zinc and calcium stearates were weighed into the resin solution prepared above, and again mixed thoroughly to dissolve the organics and to disperse the stearates. The talc and silica were then weighed into the container with the organics and stearates, and mixed thoroughly to disperse the solids. All of the mixing occurred without external heating.

The free radical generating initiator, in this instance, tertiary butyl peroxybenzoate, was added to the in-mold coating solution prepared as set forth above, and mixed thoroughly.

A polyolefin substrate, polypropylene, was heated to an initial temperature of 400–500° F. and injected into a closed mold. Molding conditions for the polypropylene were a mold temperature of 200–250° F., a 180 second cure time, and ~250 bar (3600 psi) pressure.

The in-mold coating composition of Recipe A, below, was injected into the mold, where it came into contact with the surface of the polypropylene substrate, the temperature of which was at or above the temperature at which free radicals are generated in the coating composition and at which cure was effected. The mold was opened after ~180 seconds and the polypropylene work piece having a partially cured coating composition adhered thereto was removed.

TABLE A

| Recipe A ingredients | Parts By Weight |
| --- | --- |
| Polyester Urethane Acrylate | 100 |
| Hexane diol acrylate | 25 |
| Styrene | 42 |
| Isobornyi Acrylate | 66 |
| Hydroxypropyl Methacrylate | 10.1 |
| Hydroquinone | 0.23 |
| 12% Cobalt Octoate (in Mineral Oil) | 0.29 |
| Hindered Amine Light Stabilizer | 1.7 |
| UV Absorber | 3.4 |
| Zinc Stearate | 5.5 |
| Calcium Stearate | 1.8 |
| Talc | 11.4 |
| Silica | 6.8 |
| TBPB (Initiator) | 1.2 |

The polypropylene work piece was tested for adhesion properties using Daimler Chrysler Laboratory Procedure LP-463PB-15-01 (Cross-Cut Lattice followed by Tape pull). The results under the noted conditions are shown in Table B.

TABLE B

| | |
| --- | --- |
| Initial Adhesion Test | Rating 5, Methods A and B, (No peeling or removal of coating) |
| Post 240 Hr. Water Immersion, 32° C. | Rating 5, Methods A and B, (No peeling of removal of coating) |
| Post 240 Hr. Humidity Exposure, ASTM D 1735 | Rating 5, Methods A and B, (No peeling or removal of coating) |

PROPHETIC EXAMPLE

A polyolefin substrate, polyethylene, is heated to an initial temperature above its melt temperature and is injected into a closed mold. Molding conditions for the polyethylene are a mold temperature of 160–200° F., a cure time in the range of 100 to 200 seconds, and a pressure ranging from 200–250 bar.

An in-mold coating composition of the type described herein, containing a suitable free radical source for the coating selected, also as described herein, is injected into the mold, where it will come into contact with the surface of the polyethylene substrate, the surface temperature of which is at or above the temperature at which free radicals are generated in the coating composition and at which cure is effected. The mold is opened after ~180 seconds and a polyethylene work piece having a partially cured coating composition adhered thereto is removed. A work piece having a single in-mold coating having excellent appearance and other surface properties will result.

As described by the specification and demonstrated by the aforenoted examples, according to the present invention, it is possible to form a polyolefin work piece having a single in-mold coating that has excellent adhesion, appearance, weather resistance, surface characteristics, and solvent resistance. The present invention makes such a polyolefin work piece possible without the necessity of applying a coating step to a molded work piece withdrawn from the mold.

While in accordance with the Patent Statutes, the best mode and preferred embodiment has been set forth, the scope of the invention is not limited thereto, but rather by the scope of the attached claims.

What is claimed is:

1. A work piece consisting essentially of polyolefin having a thermoset coating adhered thereto made by a process comprising the steps of:
   a. forming a thermoplastic work piece in a closed mold;
   b. injecting a thermoset coating composition capable of free radical initiation into said closed mold such that said coating comes in contact with at least a portion of a surface of said work piece; and
   c. opening said mold and removing said work piece after said coating composition has at least partially cured.

2. A work piece consisting essentially of polyolefin having a thermoset coating adhered thereto made by a process comprising the steps of:
   a. introducing a polyolefin material into a closed mold to form a work piece;
   b. introducing into said closed mold a thermoset coating composition, said composition including a component capable of generating free radicals, said composition contacting at least a portion of a surface of said work piece, a surface temperature of said workpiece being at or above the temperature at which free radicals are generated in said coating composition; and
   c. opening said mold and removing said work piece after said coating composition has at least partially cured.

3. A work piece consisting essentially of polyolefin having a thermoset coating adhered thereto made by a process comprising the steps of:
   a. introducing a polyolefin material heated to a temperature at or above its melting point into a closed mold to form a work piece;
   b. introducing into said closed mold a thermoset coating composition including a component capable of generating free radicals to contact at least a portion of a surface of said work piece, the temperature of said surface being at or above the temperature at which free radicals are generated in said coating composition; and
   c. opening said mold and removing said work piece after said coating composition has at least partially cured.

4. The polyolefin work piece of claim 3 wherein said polyolefin comprises polypropylene.

5. The polyolefin work piece of claim 3, wherein said polyolefin substrate is selected from the group consisting of polypropylene, polyethylene, polystyrenes, polybutylenes, and mixtures thereof.

6. The polyolefin work piece of claim 3, wherein said mold is heated to a temperature of 200–250° F. during steps a and b.

7. The polyolefin work piece of claim 6, wherein said polyolefin material is heated to a temperature of 400–500° F. prior to introduction into said mold.

8. The polyolefin work piece of claim 3, wherein said thermoset coating composition is injected into said mold at a pressure of 1000–5000 psi.

9. The polyolefin work piece of claim 3, wherein said component capable of generating free radicals is selected from the group consisting of peroxide initiators and azo initiators.

10. The polyolefin work piece of claim 9, wherein said component capable of generating free radicals is tertiary butyl peroxybenzoate.

11. The polyolefin work piece of claim 3, wherein an internal pressure in said mold is about 100 bar when said thermoset coating is introduced into said mold.

12. The polyolefin work piece of claim 3, wherein said work piece is formed at an internal mold pressure of about 250 bar.

13. A molded polypropylene work piece including a thermoset coating bonded thereto, said coating comprising a coating composition including a free radical generating component.

14. A molded polypropylene work piece according to claim 13 wherein said component capable of generating free radicals is a peroxide initiator.

15. A molded polypropylene work piece according to claim 14 wherein said peroxide initiator is selected from the group consisting of tertiary butyl perbenzoate, tertiary butyl peroctoate and mixtures thereof.

16. A molded polypropylene work piece according to claim 15 wherein said peroxide initiator is tertiary butyl perbenzoate.

17. A molded polypropylene work piece according, to claim 13 wherein said component capable of generating free radicals is an azo-initiator.

18. A molded polypropylene work piece comprising a thermoset coating bonded thereto, said coating made from a saturated aliphatic polyester urethane intermediate, a saturated (cyclo) aliphatic (meth) acrylate, one or more hydroxy alkyl (meth) acrylates, a polyacrylate ester of an alkylene polyol, one or more vinyl substituted aromatics, and an initiator capable of generating free radicals in said coating composition.

19. A molded polypropylene work piece having a thermoset in-mold coating adhered thereto, made by a process comprising the steps of:
   a. introducing a polypropylene substrate heated above its melt temperature into a closed mold of temperature of from about 200° F. to about 250° F. to form a work piece;
   b. introducing into said closed mold a thermoset coating composition comprising a saturated aliphatic polyester urethane intermediate, isobornyl acrylate, hydroxypropyl methacrylate, hexane diol acrylate, styrene, and tertiary butyl perbenzoate;
   c. opening said mold and removing said work piece after said coating composition has at least partially cured.

20. A molded polyolefin work piece made by a process comprising the steps of:

a. introducing a polyolefin substrate into a closed mold to form a work piece, with a mold temperature suitable for the activation of a free radical source;

b. introducing into said closed mold a thermoset coating composition comprising a saturated aliphatic polyester urethane intermediate, an aliphatic or cycloaliphatic saturated portion (meth) acrylate, one or more hydroxy alkyl (meth)acrylates, a polyacrylate ester of an alkylene glycol, one or more vinyl substituted aromatics, and an initiator capable of generating free radicals in said coating composition;

c. opening said mold and removing said work piece after said coating composition has at least partially cured.

21. A thermoplastic work piece having a thermoset coating adhered thereto made by a process comprising the steps of:

a. forming a thermoplastic work piece in a closed mold;

b. injecting a thermoset coating composition capable of free radical initiation into said closed mold such that said coating comes in contact with at least a portion of a surface of said work piece, wherein said thermoset coating comprises a saturated aliphatic polyester urethane intermediate, a saturated (cyclo) aliphatic (meth) acrylate, one or more hydroxy alkyl (meth) acrylates, a polyacrylate ester of an alkylene polyol, one or more vinyl substituted aromatics, and an initiator capable of generating free radicals in said coating composition; and c. opening said mold and removing said work piece after said coating composition has at least partially cured.

\* \* \* \* \*